Figure 1:
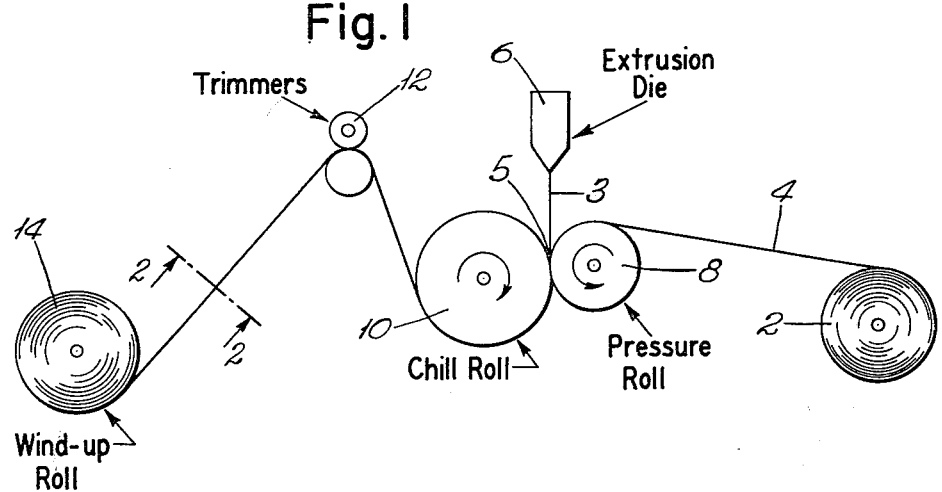

April 28, 1964     H. A. ARBIT ETAL     3,131,113

CELLULOSIC MATERIAL HAVING IMPROVED ADHESION TO POLYETHYLENE

Filed March 12, 1959

INVENTORS
HAROLD A. ARBIT
RICHARD S. BRISSETTE
ROBERT W. GAINES

BY *James C. Arrantes*
ATTORNEY

United States Patent Office 3,131,113
Patented Apr. 28, 1964

3,131,113
CELLULOSIC MATERIAL HAVING IMPROVED
ADHESION TO POLYETHYLENE
Harold A. Arbit, Plainfield, and Richard S. Brissette,
Emerson, N.J., and Robert W. Gaines, Darien,
Conn., assignors to Union Carbide Corporation, a
corporation of New York
Filed Mar. 12, 1959, Ser. No. 798,961
7 Claims. (Cl. 161—151)

This invention relates to improving the adhesion of cellulosic material to polyethylene film. More particularly, this invention relates to flat cellulosic structures such as woven or knitted fabrics, mats, felts, webs, sheets of paper, paperboard, and the like, containing polyethylene fibers, which are coated or surfaced with polyethylene film.

Composite structures of cellulosic material bonded to polyethylene film have found wide use in a variety of applications such as food packaging and numerous other barrier applications. Polyethylene imparts to the composite structure such properties as water and water vapor resistance, low temperature flexibility, grease resistance, heat sealability, chemical inertness, and thermal stability. In turn, the cellulosic material serves as a reinforcement for the polyethylene film preventing propagation of tears therein which may have been started by punctures or nicks. Moreover, the cellulosic material imparts dimensional stability to flexible polyethylene films.

The application of polyethylene film to flat cellulosic material is generally accomplished by a high speed, extrusion coating technique wherein films of polyethylene can be easily and quickly applied. This process also provides for the coverage of a large surface area of cellulosic material per unit weight of polyethylene and is therefore highly attractive from a commercial standpoint.

The extrusion coating technique involves extruding polyethylene through a flat profile die into the form of a film at extrusion temperatures of from about 250° C. to about 350° C. The extruded film is drawn down from the die into the nip of two cooperating, rotating rolls, positioned directly beneath the die, at a rate greater than the rate of extrusion. One of the rotating rolls is a pressure roll which forces the cellulosic material into intimate contact with the polyethylene film; the other is a chill roll which serves to cool the polyethylene film below its softening temperature, that is, below the temperature at which the polyethylene film is tacky or sticky to the touch. A flat cellulosic material is drawn from a supply source such as a roll, passed over the pressure roll and pressed into contact with the hot polyethylene film at the nip of the rotating rolls. Simultaneously, the polyethylene film comes into direct contact with the chill roll and is cooled to a temperature below its softening temperature. The composite structure is conveniently wound up on a roll.

The extrusion coating technique, although highly attractive, particularly from the standpoint of speed and cost, has been found deficient, however, in that adhesion of the polyethylene to the cellulosic material has been found to be relatively poor. Poor adhesion of polyethylene film to cellulosic material is accentuated when the polyethylene film has a thickness of about one mil or less.

Efforts to improve the adhesion of polyethylene film to cellulosic material while still utilizing the extrusion coating technique have been made by (1) extruding the polyethylene into a film at higher temperatures, (2) decreasing both the rate of extrusion of polyethylene and the rate at which the cellulosic material is fed into the nip of the rotating rolls, and (3) maintaining the chill roll at a higher temperature whereby the polyethylene is cooled at a slower rate.

These expedients, however, are commercially impractical and create problems which are even more serious than the problems of poor adhesion. Increasing the temperature at which polyethylene is extruded results in the development of undesirable odors in the polyethylene. Decreasing both the rate of extrusion and the rate at which the cellulosic material is fed into the nip of the rotating rolls results in poor operating efficiency, while chilling the polyethylene film slowly results in poor release of the composite structure from the chill roll.

It has now been found that the problem of poor adhesion between a cellulosic material and polyethylene film can be successfully overcome by incorporating polyethylene fibers in the cellulosic material prior to the bonding of the cellulosic material to the polyethylene film.

Figure 2:
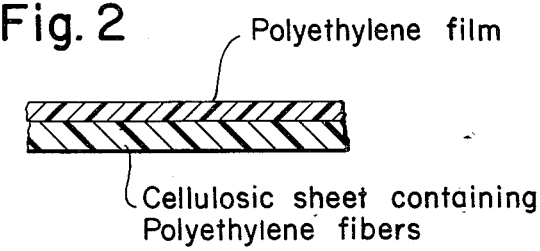

Referring now to the accompanying drawing, there is shown, in FIGURE 1, a schematic view of an apparatus which can be conveniently used to bond polyethylene film to a cellulosic sheet which contains polyethylene fibers. FIGURE 2 of the drawing, taken across line 2—2 of FIGURE 1, shows a cross-section of the composite structure of the present invention.

Incorporating polyethylene fibers in a cellulosic material and bonding the cellulosic material to polyethylene film results in a composite structure which is extremely resistant to delamination and finds wide use as a barrier material. Moreover, by the present invention it is now possible to effectively bond cellulosic material to polyethylene film having a thickness of less than about one mil by means of the highly attractive extrusion coating technique.

As little as about 2 percent by weight of polyethylene fibers in the cellulosic material is sufficient to improve the adhesion thereof to polyethylene film. A polyethylene fiber content in excess of about 60 percent by weight does not materially improve adhesion and is undesirable from an economic standpoint.

All percentages noted in this specification and appended claims are based on the weight of the cellulosic material.

Various types and sizes of polyethylene fibers, in the amounts noted above, can be incorporated in the cellulosic material to improve the adhesion thereof to polyethylene. The actual length, denier, and the like of the fibers will depend upon the type of cellulosic material which is to be formed. The fibers, if desired, can also be treated with various sizing agents which are well known in the art.

Polyethylene fibers are prepared from a normally solid polyethylene, preferably from a polyethylene having a density at 23° C. of from about 0.91 to about 0.98 and a melt index of from about 0.5 to about 20. A particularly desirable fiber for purposes of this invention, hereinafter designated as "fiber B" is one produced by melt extruding through spinnerets and cold drawing a polyethylene having a density at 23° C. of about 0.950 and a melt index of 10. "fiber B" has the following properties:

Tenacity, grams/denier _____ 4.5
Percent elongation _____ 18
Sticking temperature in ° C. _____ 128
Percent shrinkage _____ 12
Denier _____ 4

Density and melt index determinations noted in this application were made according to the procedures described in ASTM D–71–27 and ASTM D–1238–52T respectively.

Values for the determination of percent elongation were ascertained on an Instron Tester and calculated according to the formula:

$$\text{Percent elongation} = \frac{100 \times \text{length of fiber at break minus original length of fiber}}{\text{Original length of fiber}}$$

Sticking temperature in degrees centigrade is the lowest temperature at which the fiber is sticky or tacky to the touch.

Percent shrinkage was determined by placing a sample fiber in boiling water for five minutes and calculating the percent shrinkage by means of the following formula:

$$\text{Percent shrinkage} = \frac{100 \times \text{original length of fiber} - \text{length of fiber after 5 minutes in boiling water}}{\text{Original length of fiber}}$$

A composite structure or laminate comprising a polyethylene film bonded to a cellulosic material wherein the cellulosic material contains from about 2 to about 60 percent by weight "fiber B" is highly resistant to delamination and has unusually good strength characteristics.

The polyethylene fibers can be added to the cellulosic material by any one of a number of known methods. For example, in the production of a paper sheet, the polyethylene fibers, in a length convenient for paper making can be added dry to an aqueous slurry of paper pulp and the resultant formulation processed into a paper sheet in conventional paper making apparatus. In formulating a cellulosic material for processing into a paper sheet, it is preferred to incorporate therein from about 2 to about 30 percent by weight of polyethylene fibers, as paper sheet material produced therefrom has exceedingly good adhesion to polyethylene film. More than about 60 percent by weight of polyethylene fibers in paper sheet material is not only economically unattractive, as previously stated, but generally the paper does not have enough strength to be handled in conventional paper making apparatus.

The polyethylene fibers can also be spun with cellulosic fibers to form a yarn and the yarn woven into a fabric.

A woven or unwoven fabric containing from about 5 to about 25 percent by weight polyethylene fibers is preferred for purposes of the invention, as such a fabric has particularly good adhesiveness to polyethylene film.

Illustrative of cellulosic material whose adhesiveness to polyethylene film can be improved by the addition thereto of polyethylene fibers are the following: paper, paperboard, glassine, and the like, cellulosic fibers such as cotton, kapok, flax, hemp, ramie, sisal, manila hemp, regenerated cellulose, and the like.

Synthetic fibers other than polyethylene fibers can, if desired, be added to the cellulosic material.

The polyethylene film is generally extruded from a normally solid polyethylene having a density at 23° C. of at least about 0.91 and preferably from about 0.91 to about 0.94. The thickness of the polyethylene film can be varied as desired from fractions of a mil wherein the film is flexible to as high as 10 mils and higher wheerin the film is more rigid.

The polyethylene, if desired, can be modified by the addition thereto, in suitable amounts and prior to the formation thereof into a film, of modifiers such as lubricants, antioxidants, dyes, pigments, mineral fillers, stabilizers, slip agents, and the like.

In the following examples, which are intended to illustrate the present invention without limiting the scope thereof in any manner, the cellulosic material was bonded to polyethylene film by means of the apparatus shown in FIGURE 1 of the accompanying drawing to form a composite structure as shown in FIGURE 2. Polyethylene was extruded from extrusion die 6 into the form of a film 3 which was fed into nip 5 of rotating rolls 8 and 10, roll 8 being a pressure roll having a silicon rubber covering, the roll 10 being a metal surfaced chill roll. Flat cellulosic material 4 was drawn from feed roll 2 over pressure roll 8 and forced into intimate contact with film 3 by means of pressure roll 8 at the nip 5. Simultaneously, the film 3 came into direct contact with chill roll 10 and was cooled. The composite structure was drawn around the outer periphery of chill roll 10 whereby it was further cooled to a temperature well below the softening temperature of the polyethylene film. The edges of the composite structure were then trimmed by trimmers 12 and the structure was wound up on roll 14. The operating conditions, such as the rate of extrusion of the polyethylene into the form of a film, extrusion temperatures, and the like are noted in the examples.

The extruder used had a die orifice of 24 inches long and 0.020 inch wide, a cylinder diameter of 2½ inches, and was equipped with a metering type, decreasing depth screw having a 2½ inch constant pitch and a compression ratio of 3.5 to 1. A series of 20/60/20 mesh screens were positioned at the discharge end of the extruder cylinder. The distance between the extrusion die orifice and the nip of the rotating rolls was 3 inches, the pressure at the nip was 100 lbs. per lineal inch and the temperature of the chill roll was 55° C.

The strength of the bond between the cellulosic material and the polyethylene film was determined using an Instron Tester wherein readings were taken of the force in grams required to delaminate the cellulosic material from the polyethylene film. A sample of the laminate of a size convenient to handle was manually delaminated to provide just enough material to be gripped in the jaws of the Instron Tester. The polyethylene film was gripped in one jaw, the cellulosic material in the other jaw, and the force required to completely delaminate the structure noted.

*Example I*

In this example the cellulosic sheets contained 10 percent by weight polyethylene "fiber B." A slurry of paper making fibers was prepared by beating an Abitibi brand bleached sulfite pulp in a Valley beater to a Canadian standard freeness of 240.

Sheets A, B, and C were prepared in the following manner: 2.5 grams of the bleached sulfite pulp were dispersed in 10 liters of water in the deckle box of a Noble and Wood sheet making apparatus having a 8 inch by 8 inch sheet mold. 0.25 gram of a 4 denier, ¼ inch long polyethylene fiber and one drop of a dispersing agent (Ethomeen S/16) were then added to the pulp dispersion. The cellulosic pulp formulation was stirred vigorously, allowed to settle for 12 seconds, at the end of which time the drop valve in the mold was opened, thereby allowing cellulosic pulp to drain and filter on the paper-making wire of the sheet making apparatus. The sheet was then pressed between wool felts to a consistency of 32 percent by weight solids. The sheet was then dried on a heated drum having a temperature of 105° C. for 3 minutes.

Sheets designated as controls 1, 2, and 3 were prepared in the same manner with the exception that no polyethylene fibers and dispersing agents were added to the cellulosic pulp.

Each sheet was thereafter bonded to polyethylene film. The polyethylene which was extruded into film material had a density of 0.920 at 23° C. and a melt index of 2. The bonding strength of each laminate as indicated by the force required to delaminate is noted in the table below.

Ethomeen S/16, manufactured by Armour Co., is a cationic surface-active agent produced by reacting an aliphatic amine having 16 carbon atoms with ethylene oxide.

In further explanation of the term machine direction and the term transverse direction which are used in subsequent examples, machine direction indicates that a sample was obtained from a composite structure by cutting the composite structure in the machine direction to provide a sample having the desired width, generally ½ to one inch wide; transverse direction indicates that the composite structure was cut transverse to the machine direction to obtain a sample having the desired width. In both cases samples generally had a length of about 6 inches.

| Sheet material | Extrusion coating conditions ||| Force in grams required to delaminate ½ inch wide samples, machine direction |
|---|---|---|---|---|
| | Extrusion temperature in °C. of polyethylene | Rate of extrusion of polyethylene film in lbs. per hour | Film thickness in mils | |
| Sheet A | 283 | 31 | 0.5 | 10 |
| Control 1 | 283 | 31 | 0.5 | 2 |
| Sheet B | 277 | 74.4 | 0.75 | 10 |
| Control 2 | 277 | 74.4 | 0.75 | 3.5 |
| Sheet C | 277 | 74.2 | 1.0 | 25 |
| Control 3 | 277 | 74.2 | 1.0 | 5 |

Example II

A slurry of paper-making fibers was prepared by beating Springhill brand unbleached kraft pulp in a Valley beater until it had a Canadian standard freeness of 240. Cellulosic sheets were prepared in a manner described in Example I. Sheets designated as controls 4, 5, and 6 did not contain any polyethylene fibers. Sheets D through L contained polyethylene "fiber B" in amounts noted in the table below.

The cellulosic sheets were then laminated to polyethylene film. The polyethylene film was extruded from polyethylene having a density of 0.920 at 23° C. and a melt index of 2.

| Sheet material | Extrusion coating conditions ||| Force in grams required to delaminate ½ inch wide samples, machine direction |
|---|---|---|---|---|
| | Extrusion temperature in °C. of polyethylene | Rate of extrusion of polyethylene film in lbs. per hour | Film thickness in mils | |
| Sheet D contained 2% by wt. polyethylene fibers | 277 | 74.4 | 0.75 | 3 |
| Sheet E contained 10% by wt. polyethylene fibers | 277 | 74.4 | 0.75 | 9 |
| Sheet F contained 25% by wt. polyethylene fibers | 277 | 74.4 | 0.75 | 45 |
| Control 4 | 277 | 74.4 | 0.75 | 1 |
| Sheet G contained 2% by wt. polyethylene fibers | 283 | 31 | 0.5 | 10 |
| Sheet H contained 10% by wt. polyethylene fibers | 283 | 31 | 0.5 | 26 |
| Sheet I contained 25% by wt. polyethylene fibers | 283 | 31 | 0.5 | 28 |
| Control 5 | 283 | 31 | 0.5 | 2 |
| Sheet J contained 2% by wt. polyethylene fibers | 277 | 72.2 | 1.0 | 22 |
| Sheet K contained 10% by wt. polyethylene fibers | 277 | 72.2 | 1.0 | 30 |
| Sheet L contained 25% by wt. polyethylene fibers | 277 | 72.2 | 1.0 | 35 |
| Control 6 | 277 | 72.2 | 1.0 | 7 |

Example III

This example is illustrative of cellulosic fabrics containing polyethylene fibers which have improved adhesion to polyethylene film. "Fiber B" was blended with staple cotton fibers, the blend spun into yarn, and the yarn woven into a fabric. The fabric was then laminated to polyethylene film. Amount of polyethylene fiber in the fabric is noted in the table below which also notes extrusion conditions involving the bonding of the fabric to polyethylene film and the force in grams required to delaminate sample strips of the composite article.

| Description of cloth in terms of number of warp and woof ends || Extrusion coating conditions ||| Percent by weight of polyethylene fiber || Force in grams required to delaminate samples one inch wide ||
|---|---|---|---|---|---|---|---|---|
| Warp | Woof | Extrusion Temperature of polyethylene in °C. | Rate of extrusion of polyethylene film in lbs. per hour | Film thickness in mils | Warp | Woof | Machine direction | Transverse direction |
| 60 by 60 | | 265 | 60 | 1.5 | 0 | 0 | 88 | 60 |
| 60 by 60 | | 265 | 60 | 1.5 | 0 | 10 | 100 | 160 |
| 60 by 60 | | 256 | 60 | 1.5 | 0 | 20 | 150 | 210 |
| 60 by 56 | | 265 | 60 | 1.5 | 10 | 10 | 505 | 282 |
| 60 by 56 | | 265 | 60 | 1.5 | 20 | 20 | 320 | 325 |
| 60 by 56 | | 265 | 60 | 1.5 | 10 | 20 | 475 | 500 |
| 60 by 56 | | 265 | 60 | 1.5 | 20 | 10 | 255 | 290 |

Example IV

This example illustrates the fact that the adhesiveness of a cellulosic material, containing polyethylene fibers, to polyethylene film is not affected by the presence in the cellulosic material of synthetic fibers other than polyethylene.

Springhill brand unbleached kraft pulp was dispersed by means of a high speed agitator in 8 liters of water for 30 minutes. Dry fiber was added to the pulp and the resultant pulp formulation beaten to a consistency giving a drainage time of 20 seconds when the material was allowed to drain freely on the screen of the paper making apparatus. The material was thereafter formed into sheets in a manner described in Example I.

A number of sheets were then laminated to polyethylene film extruded from polyethylene having a density at 23° C. of 0.918 and a melt index of 3. Force in grams required to delaminate the laminates is noted in the table below.

The extrusion temperatures at which the polyethylene was formed into film were 280° C., the rates of extrusion were 74.4 lbs. per hour.

The polyethylene fibers were produced from polyethylene having a density of 0.919; the polystyrene fibers from polystyrene having a density of 1.02–1.05; the vinyl chloride resin fibers from a vinyl chloride-vinyl acetate polymer having a density of 1.35. The synthetic fibers had a diameter size on the order of 2–200 microns. The vinyle chloride-vinyl acetate polymer contained about 84 percent by weight vinyle chloride combined therein.

| Wt. of sheet | Sheet material, percent by wt. fibers* | Film thickness in mils | Force in grams required to delaminate one inch wide samples, machine direction |
|---|---|---|---|
| 40 lbs. per ream | 1–100% kraft fibers | 0.5 | 7 |
| | | 0.75 | 7 |
| | | 1 | 7 |
| Do | 2–6% polyethylene 26% polystyrene. | 0.5 | 12 |

| Wt. of sheet | Sheet material, percent by wt. fibers* | Film thickness in mils | Force in Grams required to delaminate one inch wide samples, machine direction |
|---|---|---|---|
| 40 lbs. per ream | 3–6% polyethylene, 26% polystyrene. | 0.75 | 17 |
| Do | 4–6% polyethylene, 26% polystyrene. | 1.0 | 20 |
| Do | 5–6% polyethylene, 26% vinyl chloride resin. | 0.75 | 17 |
| Do | 6–6% polyethylene, 26% vinyl chloride resin. | 1.0 | 17 |
| Do | 7–20% polyethylene, 80% vinyl chloride resin. | 0.5 | 15 |
| Do | 8–20% polyethylene, 80% vinyl chloride resin. | 0.75 | 19 |
| Do | 9–20% polyethylene, 80% vinyl chloride resin. | 1.0 | 22 |
| 80 lbs. per ream | 10–100% kraft fibers. | 0.5 / 0.75 / 1 | 3 / 5 / 7 |
| Do | 11–6% polyethylene, 26% vinyl chloride resin. | 0.5 | 12 |
| Do | 12–60% polyethylene, 240% vinyl chloride resin. | 0.5 | 27 |
| Do | 13–60% polyethylene, 240% vinyl chloride resin. | 0.75 | 49 |
| Do | 14–60% polyethylene, 240% vinyl chloride resin. | 1.0 | 30 |

*Percent weight of the synthetic resin fibers is based on the cellulosic content of the sheets.

Referring now to the accompanying drawing, there is shown, in FIGURE 1, a schematic view of an apparatus which can be conveniently used to bond polyethylene film to a cellulosic sheet which contains polyethylene fibers. FIGURE 2 of the drawing, taken across line 2—2 of FIGURE 1, shows a cross section of the composite structure of the present invention.

Cellulosic material such as the cellulosic paper sheets and the cellulosic fabric can, if desired, be surfaced on both sides with polyethylene to produce three ply structures.

What is claimed is:

1. A composite structure consisting essentially of a cellulosic sheet containing from about 2 to about 60 percent by weight polyethylene fibers, based on the weight of the cellulosic content of said sheet, bonded to a polyethylene film.

2. A composite structure as defined in claim 1 wherein the polyethylene of the polyethylene film has a density of at least about 0.91.

3. A composite structure as defined in claim 1 wherein the polyethylene of the polyethylene has a density of from about 0.91 to about 0.94.

4. A composite structure as defined in claim 1 wherein the polyethylene fibers have a density of from about 0.91 to about 0.98.

5. A composite structure as defined in claim 1 wherein the polyethylene fibers have the following properties: denier of 4, a tenacity of 4.5, elongation of 18 percent, and a shrinkage of 12 percent.

6. A composite structure consisting essentially of paper sheet containing from about 2 to about 30 percent by weight polyethylene fibers, based on the weight of the cellulosic content of said paper sheet, bonded to polyethylene film.

7. A composite structure as defined in claim 6 wherein the polyethylene fibers have the following properties: denier of 4, a tenacity of 4.5, elongation of 18 percent and a shrinkage of 12 percent.

References Cited in the file of this patent

UNITED STATES PATENTS

| | | |
|---|---|---|
| 2,124,330 | Pascoe et al. | July 19, 1938 |
| 2,199,526 | McCowen | May 7, 1940 |
| 2,476,283 | Castellan | July 19, 1949 |
| 2,483,404 | Francis | Oct. 4, 1949 |
| 2,686,744 | Cornwell | Aug. 17, 1954 |
| 2,810,644 | Shearer | Oct. 22, 1957 |
| 2,851,389 | Lappala | Sept. 9, 1958 |

FOREIGN PATENTS

| | | |
|---|---|---|
| 491,804 | Great Britain | Sept. 8, 1938 |
| 641,568 | Great Britain | Aug. 16, 1950 |
| 742,710 | Great Britain | Jan. 4, 1956 |
| 793,444 | Great Britain | April 16, 1958 |
| 805,389 | Great Britain | Dec. 3, 1958 |

UNITED STATES PATENT OFFICE
CERTIFICATE OF CORRECTION

Patent No. 3,131,113                      April 28, 1964

Harold A. Arbit et al.

It is hereby certified that error appears in the above numbered patent requiring correction and that the said Letters Patent should read as corrected below.

Column 3, line 53, for "wheerin" read -- wherein --; column 6, lines 61 and 62, for "vinyle", each occurrence, read -- vinyl --; column 7, line 35, beginning with "Referring now" strike out all to and including "present invention." in line 41, same column 7; column 8, line 11, after "polyethylene", second occurrence, insert -- film --.

Signed and sealed this 22nd day of September 1964.

(SEAL)
Attest:

ERNEST W. SWIDER
Attesting Officer

EDWARD J. BRENNER
Commissioner of Patents